(12) United States Patent
Takahashi et al.

(10) Patent No.: US 8,218,749 B2
(45) Date of Patent: Jul. 10, 2012

(54) ENABLING MULTI-PARTY CALL IN TELEPHONE SYSTEM

(75) Inventors: Hideaki Takahashi, Nagoya (JP); Suzuyo Murai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 965 days.

(21) Appl. No.: 12/053,178

(22) Filed: Mar. 21, 2008

(65) Prior Publication Data

US 2008/0240394 A1 Oct. 2, 2008

(30) Foreign Application Priority Data

Mar. 26, 2007 (JP) ................................ 2007-079442

(51) Int. Cl.
*H04M 3/42* (2006.01)
(52) U.S. Cl. ......... 379/202.01; 379/203.01; 379/204.01; 379/205.01; 379/206.01; 709/204; 455/416
(58) Field of Classification Search ........... 379/202.01–207.01; 455/416; 709/204

See application file for complete search history.

(56) References Cited

U.S. PATENT DOCUMENTS

| | | | |
|---|---|---|---|
| 6,668,048 B1 | 12/2003 | Suga et al. | |
| 2003/0157929 A1* | 8/2003 | Janssen et al. | 455/416 |
| 2005/0037783 A1* | 2/2005 | Carley | 455/462 |
| 2005/0068938 A1* | 3/2005 | Wang et al. | 370/352 |
| 2006/0013164 A1* | 1/2006 | Paryani | 370/329 |
| 2006/0240817 A1* | 10/2006 | Akiyama et al. | 455/426.2 |
| 2007/0117556 A1* | 5/2007 | Rogalski | 455/416 |
| 2007/0149188 A1* | 6/2007 | Miyashita et al. | 455/426.1 |
| 2007/0154008 A1* | 7/2007 | Pomerantz et al. | 379/355.02 |
| 2008/0081610 A1* | 4/2008 | Bhalla | 455/425 |
| 2008/0162710 A1* | 7/2008 | Mundra et al. | 709/230 |

FOREIGN PATENT DOCUMENTS

| | | | |
|---|---|---|---|
| JP | 6-237483 A | | 8/1994 |
| JP | 06237483 | * | 8/1994 |
| JP | 11-225187 A | | 8/1999 |
| JP | 2000-209352 A | | 7/2000 |
| JP | 2003-037676 A | | 2/2003 |
| JP | 2004-096385 A | | 3/2004 |

OTHER PUBLICATIONS

JP Office Action dtd Jan. 21, 2009, JP Appln. 2007-079442.

* cited by examiner

*Primary Examiner* — Joseph J Nguyen
(74) *Attorney, Agent, or Firm* — Banner & Witcoff, Ltd.

(57) ABSTRACT

An apparatus includes a base unit and cordless handsets configured to establish a call with a communication apparatus, and a storage unit configured to store information corresponding to the communication apparatus indicating whether a multi-party call among the communication apparatus and at least two of the base unit and the cordless handsets is permitted. Also, a processing unit is configured to determine whether to enable a multi-party call among one communication apparatus, and at least two of the base unit and the cordless handsets based on the information. A method for use with the apparatus can include, in response to receiving a call from one communication apparatus, determining whether to enable a multi-party call to be established among the one communication apparatus and at least two of the base unit and the cordless handsets based on the information.

6 Claims, 6 Drawing Sheets

CONFIGURATION OF TELEPHONE DIRECTORY

| NAME | KANA | TELEPHONE NUMBER | CALL RECEIVER DESIGNATION | MULTI-PARTY CALL |
|---|---|---|---|---|
| AOKI JIRO | aoki jiro | 03-1234-5678 | ALL | YES |
| INOUE TARO | inoue taro | 03-2345-6789 | CORDLESS HANDSET 1 | NO |
| ITO SABURO | ito saburo | 052-324-9876 | BASE UNIT CORDLESS HANDSET 1 | YES |
| KATO IPPEI | kato ippei | 052-323-7654 | CORDLESS HANDSET 1 CORDLESS HANDSET 2 | NO |

Fig. 6

ENABLING MULTI-PARTY CALL IN TELEPHONE SYSTEM

BACKGROUND

1. Field

Illustrative aspects of the invention relate to telephone apparatuses.

2. Description of the Related Art

Telephone apparatuses including a base unit connected to an external line and at least one cordless handset configured to perform wireless communication with the base unit have been available.

Normally, such telephone apparatuses are configured to establish a so-called "two-party call", which is 1) a call between an external communication apparatus connected to the external line (another telephone apparatus connected to the external line) and a base unit, 2) a call between the external communication apparatus and a cordless handset in which the base unit is not party to the call, but functions as a relay, or 3) a call between the base unit and the cordless handset.

A telephone apparatus configured to establish a three-party call among an external communication apparatus, a base unit, and a cordless handset is described in Japanese Unexamined Patent Application Publication No. 2004-96385.

The telephone apparatus described in Japanese Unexamined Patent Application Publication No. 2004-96385 has a function of allowing manual change of a two-party call into a three-party call and a function of allowing automatic change of a two-party call into a three-party call.

When changing a two-party call between an external communication apparatus and a base unit into a three-party call by adding a cordless handset to the two-party call, the three-party call can be established manually by pressing a cordless-handset button in an operating part of the base unit to call the cordless handset. When changing a two-party call between an external communication apparatus and a cordless handset into a three-party call by adding a base unit to the two-party call, the three-party call can be established by pressing a base-unit button in an operating part of the cordless handset to call the base unit.

In contrast, in a system with the function of allowing automatic change of a two-party call into a three-party call, the telephone apparatus has a three-party call mode in which a three-party call is established (hereinafter, referred to as a simple relay mode). Where a user sets the three-party call mode at a base unit or at a cordless handset in advance, the three-party call is permitted to be established for an incoming call at the respective base unit or cordless handset without requiring an operation using the operating part. That is, if the three-party call is permitted and a user activates the other of the cordless handset or base unit during a two-party call between the external communication apparatus and the respective base unit or cordless handset, then a three-party call is automatically established.

However, for the telephone apparatus disclosed in Japanese Unexamined Patent Application Publication No. 2004-96385, in a case where the simple relay mode is set in advance, the telephone apparatus unconditionally establishes a three-party call. As a result, the user cannot individually decide whether to establish a call with the device calling the user's device (i.e., the base unit or cordless handset) during a two-party call.

In contrast, in a case where a user wishes to conduct a three-party call when the simple relay mode is not activated, the user must manually set the simple relay mode or must operate an operating button provided on a base unit or a cordless handset.

SUMMARY

This summary is provided to introduce a selection of concepts in a simplified form that are further described below in the Detailed Description. This summary is not intended to identify key features or essential features of the claimed subject matter.

Illustrative aspects of the present invention may provide an apparatus that includes a base unit configured to establish a call with an external communication apparatus and one or more cordless handsets configured to establish a call with the external communication apparatus through the base unit. The apparatus further includes a storage unit configured to store information corresponding to the external communication apparatus indicating whether a multi-party call among the external communication apparatus and at least two of the base unit and the one or more cordless handsets is permitted to be established. A processing unit is configured to determine whether to enable a multi-party call to be established among one external communication apparatus, and at least two of the base unit and one or more of the cordless handsets based on the information stored in the storage unit.

In another aspect in a system including a base unit, one or more cordless handsets configured to establish an external call through the base unit, and a storage unit that stores information corresponding to an external communication apparatus indicating whether establishment of a multi-party call is permitted, a method is provided. The method includes in response to receiving a call from one external communication apparatus, determining whether to enable a multi-party call to be established among the one external communication apparatus and at least two of the base unit and the one or more cordless handsets based on the information stored in the storage unit. In another aspect, a computer readable medium is provided including computer-executable instructions for performing the method.

In one illustrative aspect, a party that is permitted to join a multi-party call is registered in advance in the apparatus. In this instance, a multi-party call can be automatically established without requiring a user of the telephone apparatus to perform setting for a multi-party call for the registered party can be achieved.

In one aspect, the storage unit and the processing unit may not be provided in the base unit. In another aspect, the storage unit and the processing unit may be provided in the at least one cordless handset.

In an illustrative aspect in which the storage unit and the processing unit are provided in the at least one cordless handset, the cordless handset determines whether to permit establishment of a multi-party call for an incoming call.

In another aspect, the storage unit and the processing unit may be provided in the base unit.

These and other aspects of the disclosure will be apparent upon consideration of the following detailed description of illustrative embodiments.

DETAILED DESCRIPTION

Illustrative embodiments of the present invention will be described with reference to the drawings.

It is noted that various connections are set forth between elements in the following description. It is noted that these connections in general and, unless specified otherwise, may be direct or indirect and that this specification is not intended to be limiting in this respect.

For purposes of this description a "multi-party call" is call involving three or more parties.

Figure 1:
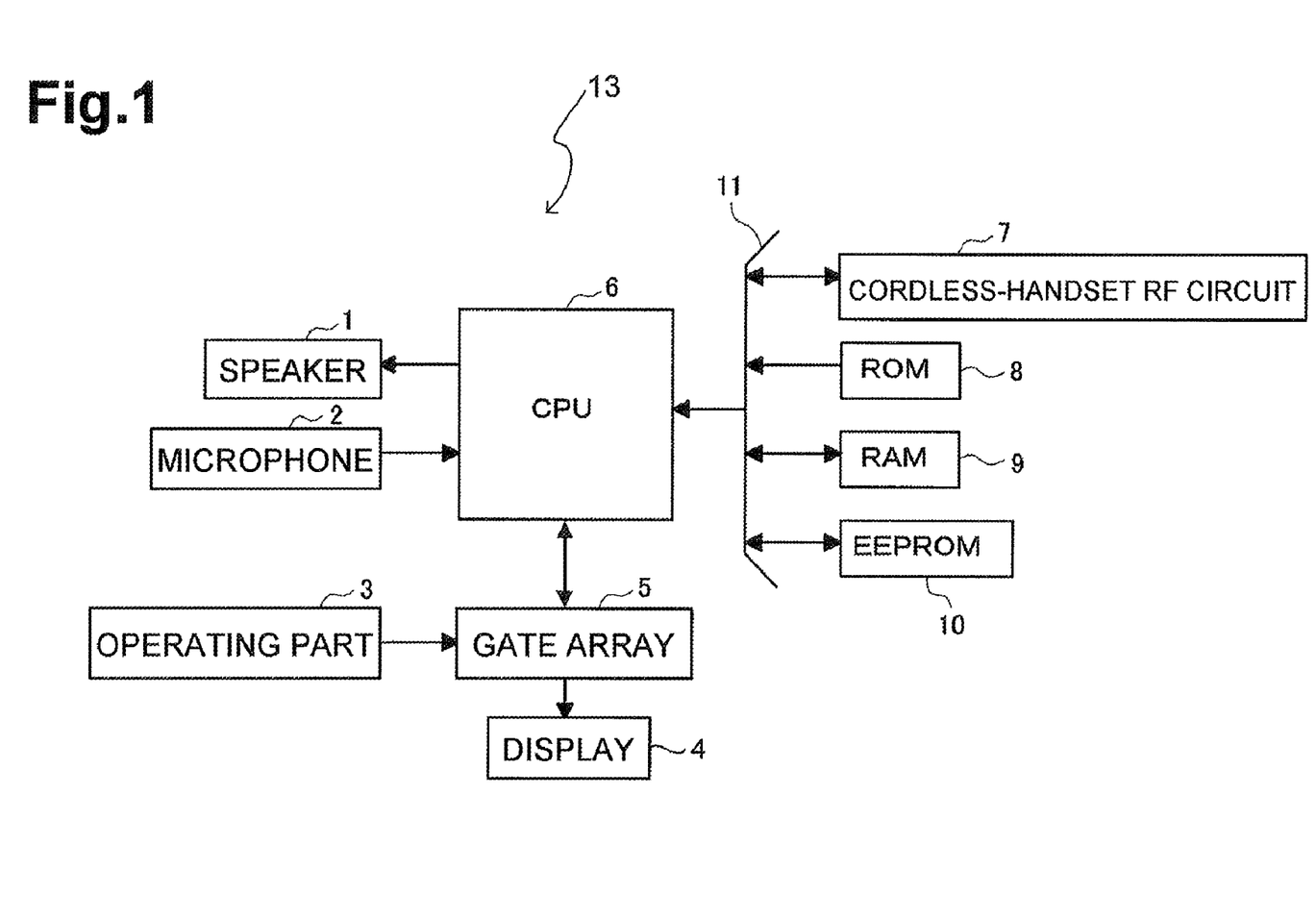
FIG. 1 is a block diagram schematically showing the configuration of a base unit of a telephone apparatus according to an illustrative embodiment of the present invention.

FIG. 1 is a block diagram schematically showing the configuration of a base unit 13 of a telephone apparatus according to an illustrative embodiment of the present invention.

Referring to FIG. 1, the base unit 13 includes a speaker 1, a microphone 2, an operating part 3, a display 4, a gate array 5, a processing unit such as central processing unit (CPU) 6, a cordless-handset radio frequency (RF) circuit 7, a read-only memory (ROM) 8, a random-access memory (RAM) 9, and a storage unit such as an electrically erasable programmable read-only memory (EEPROM) 10. It will be appreciated that the base unit 13 may be part of a multi-function device, which may include a printer, scanner, copier, and/or a facsimile machine.

The cordless-handset RF circuit 7, the ROM 8, the RAM 9, and the EEPROM 10 are electrically connected to the CPU 6 through a bus 11 and are configured to communicate with the CPU 6.

The speaker 1, the microphone 2, and the gate array 5 are electrically connected to the CPU 6 directly. The operating part 3 and the display 4 are electrically connected to the gate array 5.

The speaker 1 outputs a voice received from an external communication apparatus via an external line.

The microphone 2 receives a voice produced by the user of the base unit 13.

The operating part 3 includes various operating buttons, such as a transmission button to be pressed for originating a call, a reception button to be pressed for answering a call from an external communication apparatus or a cordless handset 51 (see FIG. 2), a cordless-handset call button to be pressed for transferring a call to the cordless handset 51, numeric-key buttons to be pressed for designating a telephone number, and a set button to be pressed for designating a party who is permitted to join a multi-party call. The various operating buttons are arranged on the surface of the base unit 13.

The display 4 displays information received from an external communication apparatus (for example, a telephone number of a communication party and the like) and the status of the base unit 13 (for example, the status of radio waves to and from the cordless handset 51 or the like).

The CPU 6 controls various parts of the base unit 13, including the speaker 1, the microphone 2, the operating part 3, and the display 4.

The gate array 5 transmits to the CPU 6 a signal received from the operating part 3. The gate array 5 also outputs to the display 4 a signal received from the CPU 6.

The cordless-handset RF circuit 7 is a circuit for wirelessly connecting the base unit 13 to the cordless handset 51.

The ROM 8 stores a control program for controlling the CPU 6.

The EEPROM (storage unit) 10 stores data of a telephone number and the like of a communication party who is permitted to join a multi-party call (a telephone directory, which will be described later), an identifier (ID) of the base unit 13, an ID of the cordless handset 51, and dialed and received call records.

The RAM 9 serves as a work area. The program stored in the ROM 8 and the data stored in the EEPROM 10 are loaded and processed in the RAM 9.

Figure 2:
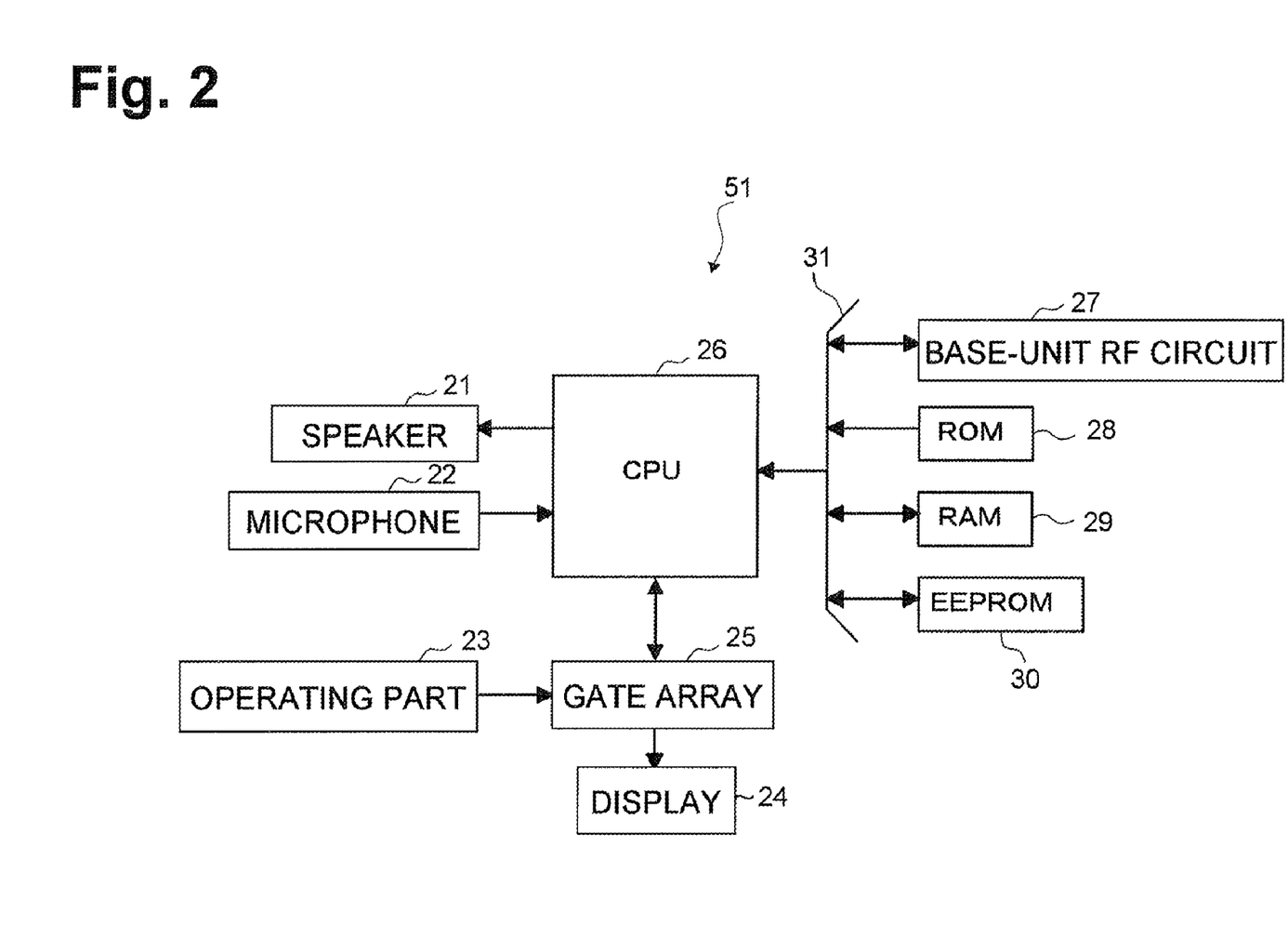
FIG. 2 is a block diagram schematically showing the configuration of a cordless handset of the telephone apparatus according to the illustrative embodiment.

FIG. 2 is a block diagram schematically showing the configuration of a cordless handset 51 (the cordless handset 51A or the cordless handset 51B) of the telephone apparatus according to this illustrative embodiment.

Referring to FIG. 2, the cordless handset 51 includes a speaker 21, a microphone 22, an operating part 23, a display 24, a gate array 25, a processing unit such as a CPU 26, a base-unit RF circuit 27, a ROM 28, a RAM 29, and a storage unit such as an EEPROM 30.

The base-unit RF circuit 27, the ROM 28, the RAM 29, and the EEPROM 30 are electrically connected to the CPU 26 through a bus 31 and are configured to communicate with the CPU 26.

The speaker 21, the microphone 22, and the gate array 25 are electrically connected to the CPU 26 directly. The operating part 23 and the display 24 are electrically connected to the gate array 25.

The speaker 21 outputs a voice or audio signal received from the base unit 13.

The microphone 22 receives a voice signal produced by the user of the cordless handset 51.

The operating part 23 includes various operating buttons, such as a transmission button to be pressed for originating a call, a reception button to be pressed for answering a call from the base unit 13, a base-unit call button to be pressed for transferring a call to the base unit 13, numeric-key buttons to be pressed for designating a telephone number, and a set button to be pressed for designating a party who is permitted to join a multi-party call. The various operating buttons are arranged on the surface of the cordless handset 51.

The display 24 displays information received from an external communication apparatus (for example, a telephone number and the like of a communication party) and the status of the cordless handset 51 (for example, the status of radio waves to and from the base unit 13 or the like).

The CPU 26 controls various parts of the cordless handset 51, including the speaker 21, the microphone 22, the operating part 23, and the display 24.

The gate array 25 transmits to the CPU 26 a signal received from the operating part 23. The gate array 25 also outputs to the display 24 a signal received from the CPU 26.

The base-unit RF circuit 27 is a circuit for wirelessly connecting the cordless handset 51 to the base unit 13.

The ROM 28 stores a control program for controlling the CPU 26.

The EEPROM 30 stores an ID of the base unit 13, an ID of the cordless handset 51, and dialed and received call records.

The RAM 29 serves as a work area. The program stored in the ROM 28 and the data stored in the EEPROM 30 are loaded and processed in the RAM 29.

Figure 3:
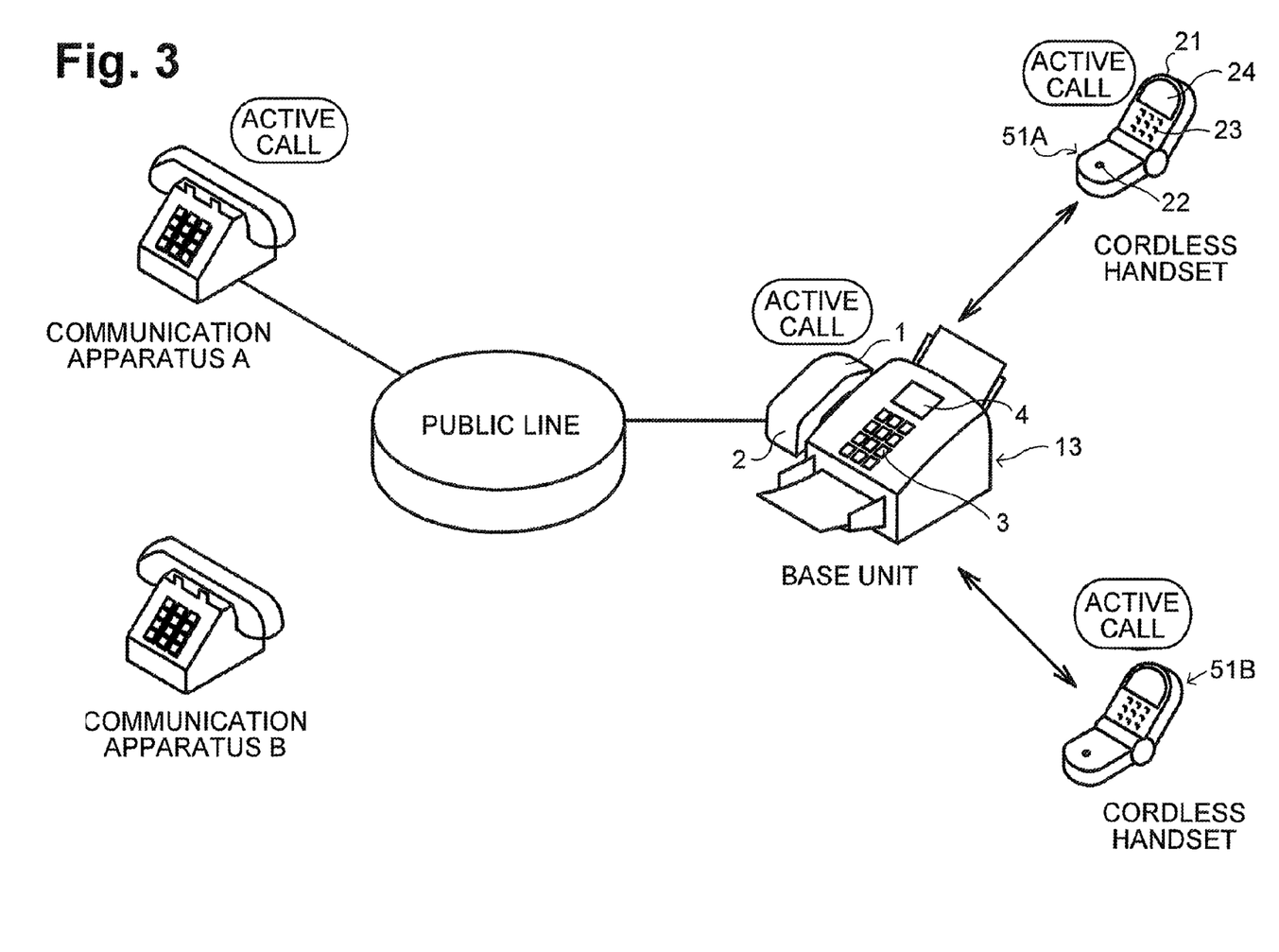
FIG. 3 shows a connection state in which a multi-party call among an external communication apparatus, the base unit, and cordless handsets can be established in the illustrative embodiment.

FIG. 3 shows a connection state in which a multi-party call among an external communication apparatus A, the base unit 13, the cordless handset 51A, and the cordless handset 51B is established in this illustrative embodiment.

Referring to FIG. 3, when receiving an incoming call from the communication apparatus A, the base unit 13 determines, in accordance with information stored in the EEPROM 10, whether a multi-party call can be established among the communication apparatus A and at least two of the base unit 13, cordless handset 51A and cordless handset 51B.

As described above, at the reception of an incoming call from the communication apparatus A, the base unit 13 (or one of the cordless handsets 51A or 51B) automatically determines whether establishment of a multi-party call is permitted for the communication apparatus A. Thus, it is not necessary for the user of the base unit 13 or a cordless handset (e.g., 51A or 51B) to perform an operation.

Figure 4:
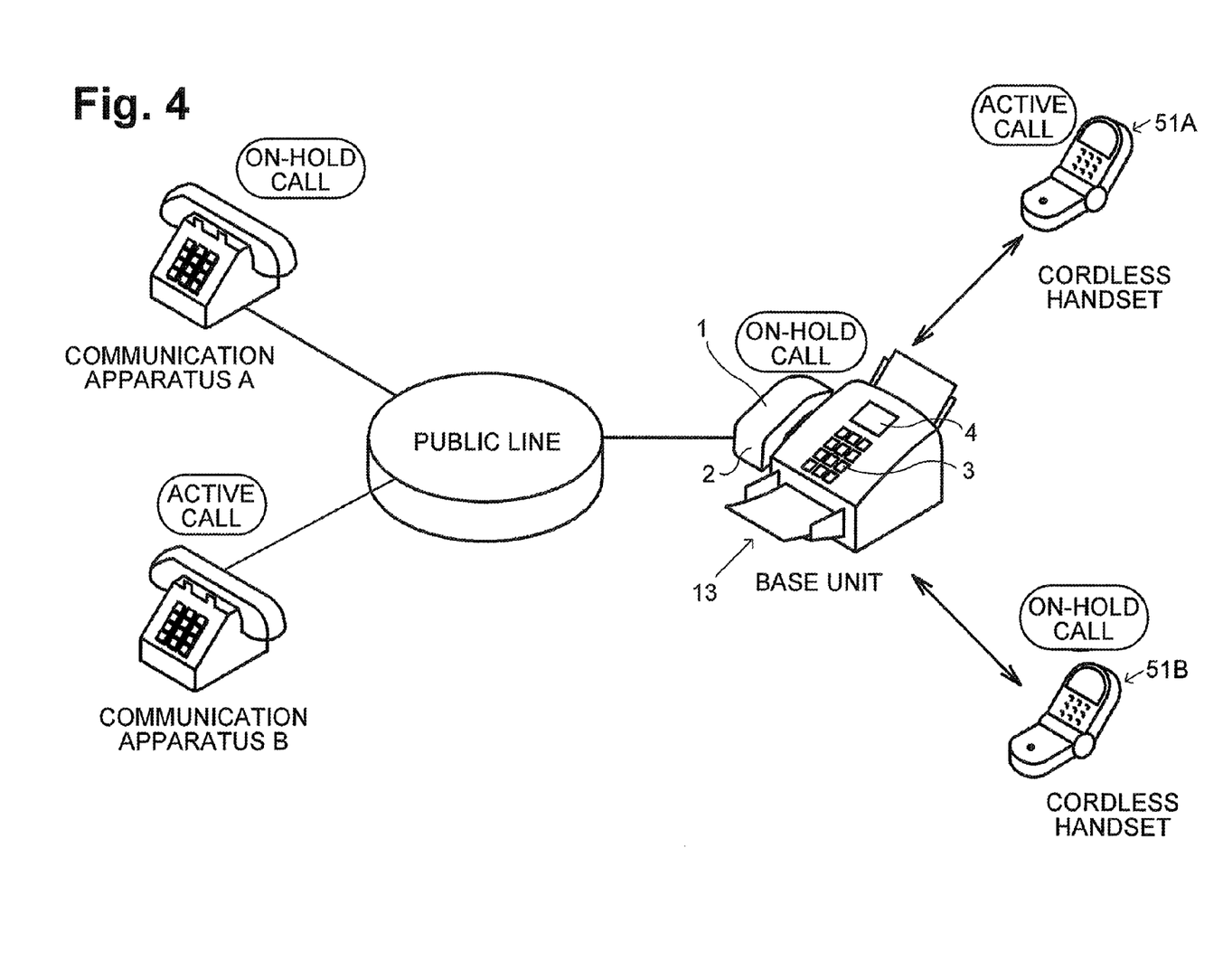
FIG. 4 shows a connection state in which an incoming call from another external communication apparatus arrives when a multi-party call among the external communication apparatus, the base unit, and the cordless handsets is established.

An illustrative embodiment will be described in connection with FIG. 4, which relates to receiving a call from an external communication apparatus during an existing call involving another communication apparatus, a base unit and cordless handsets. Of course, whether a multi-party call is to be enabled to be established can be determined when no call is ongoing. FIG. 4 shows a connection state in which an incoming call from a communication apparatus B (another external communication apparatus) arrives when a multi-party call among the communication apparatus A, the base unit 13, the cordless handset 51A, and the cordless handset 51B is established.

In this illustrative embodiment, only the cordless handset 51A is permitted to communicate with the communication apparatus B based on information stored in the EEPROM 10 of the base unit 13 (or EEPROM 30 of one of the cordless handsets 51A or 51B).

In a case where an incoming call from the communication apparatus B arrives when a multi-party call among the communication apparatus A, the base unit 13, the cordless handset 51A, and the cordless handset 51B is established as depicted in FIG. 3, only a connection between the communication apparatus B and the cordless handset 51A can be established. In this instance, the user of cordless handset 51A presses a button in operating part 23, which cause the cordless handset 51A to be connected to the communication apparatus B. At the same time and in response to the button in operating part 23 being pressed, the base unit 13, the cordless handset 51B, and the communication apparatus A enter a hold mode (that is, a mode in which a call cannot be connected) as depicted in FIG. 4.

Then, after the call between the cordless handset 51A and the communication apparatus B is terminated and the line between the cordless handset 51A and the communication apparatus B is disconnected, the connection state shown in FIG. 3 can be recovered.

That is, the connection state in which a multi-party call among the communication apparatus A, the base unit 13, the cordless handset 51A, and the cordless handset 51B is established can be recovered.

Figure 5:
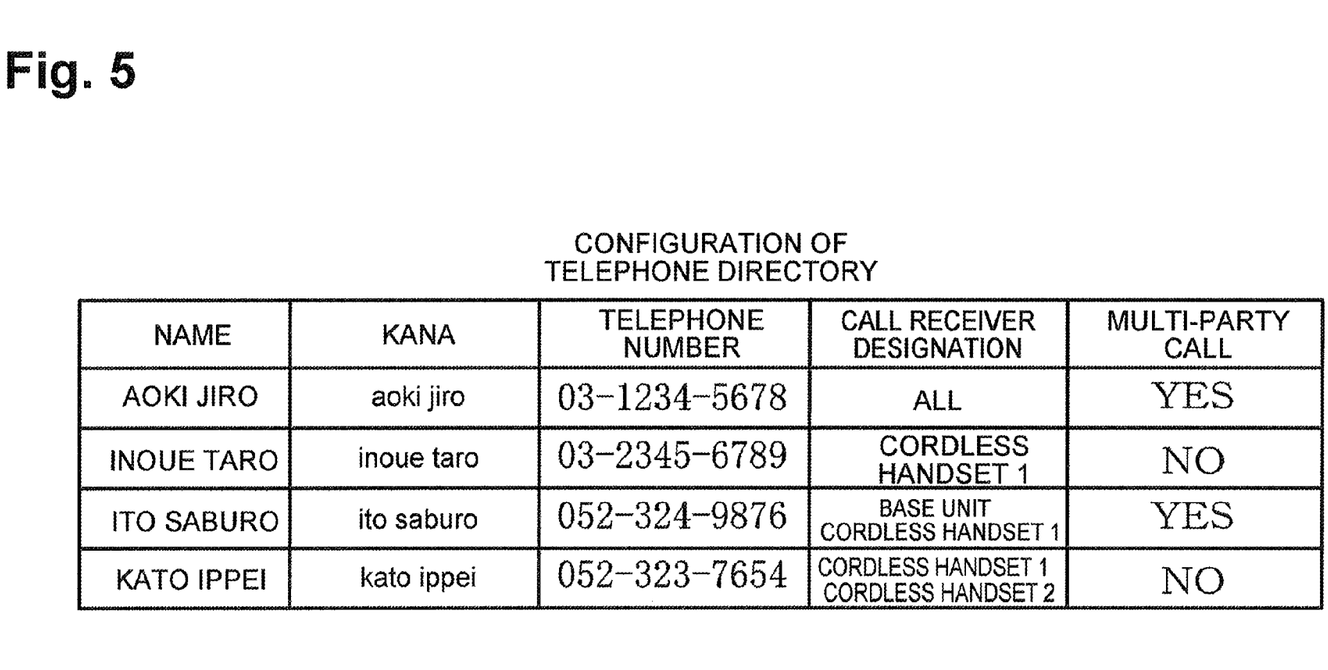
FIG. 5 shows an example of the configuration of a telephone directory used in the illustrative embodiment.

FIG. 5 shows an example of the configuration of a telephone directory stored in each of the EEPROM 10 of the base unit 13, the EEPROM 30 of the cordless handset 51A, and the EEPROM 30 of the cordless handset 51B.

The telephone directory contains an item "call receiver designation" indicating destinations to which incoming calls from external communication apparatuses are to be transferred and an item "multi-party call" indicating whether establishment of a multi-party call is permitted (YES) or inhibited (NO), as well as an item, such as "name" indicating names of callers, "kana" indicating name readings of callers in Japanese katakana characters, and "telephone number" indicating telephone numbers of callers, which are contained in normal telephone directories.

As the item "call receiver designation", destinations to which incoming calls are to be transferred, such as the base unit 13 (base unit), the cordless handset 51A (cordless handset 1), and the cordless handset 51B (cordless handset 2), are designated for individual registered callers corresponding to respective external communication apparatuses.

For example, in a case where an incoming call from the name "AOKI JIRO" corresponding to telephone number 03-1234-5678 of an external communication apparatus arrives, the base unit 13, the cordless handset 51A, and the cordless handset 51B are each permitted to receive the call. For example, in a case where an incoming call from the name "INOUE TARO" corresponding to telephone number 03-2345-6789 of an external communication apparatus arrives, only the cordless handset 51A receives the call as shown and described with respect to the example of FIG. 4.

As the item "multi-party call", permission or inhibition of the establishment of a multi-party call is registered for each of the registered callers from respective external communication apparatuses (e.g. communication apparatus A and communication apparatus B in FIG. 3).

For example, in the case of the name "ITO SABURO", the base unit 13 and the cordless handset 51A are set in the item "call receiver designation", and "YES" is set in the item "multi-party call". Thus, in a case where an incoming call from the name "ITO SABURO" corresponding to 052-324-9876 of an external communication apparatus arrives, a three-party call among "ITO SABURO", the base unit 13, and the cordless handset 51A is automatically established.

For example, in the case of the name "KATO IPPEI", the cordless handset 51A and the cordless handset 51B are set in the item "call receiver destination", and "NO" is set in the item "multi-party call". Thus, in a case where an incoming call from "KATO IPPEI" corresponding to telephone number 052-323-7654 of an external communication apparatus arrives, only one of the cordless handsets 51A or 51B can receive the call. That is, a three-party call cannot be established.

A process performed in this illustrative embodiment will be described with reference to a flowchart and the like.

In this illustrative embodiment, in addition to a case where it is determined whether establishment of a multi-party call is permitted, a case where a call-waiting signal is received in the middle of a multi-party call will be described.

Figure 6:
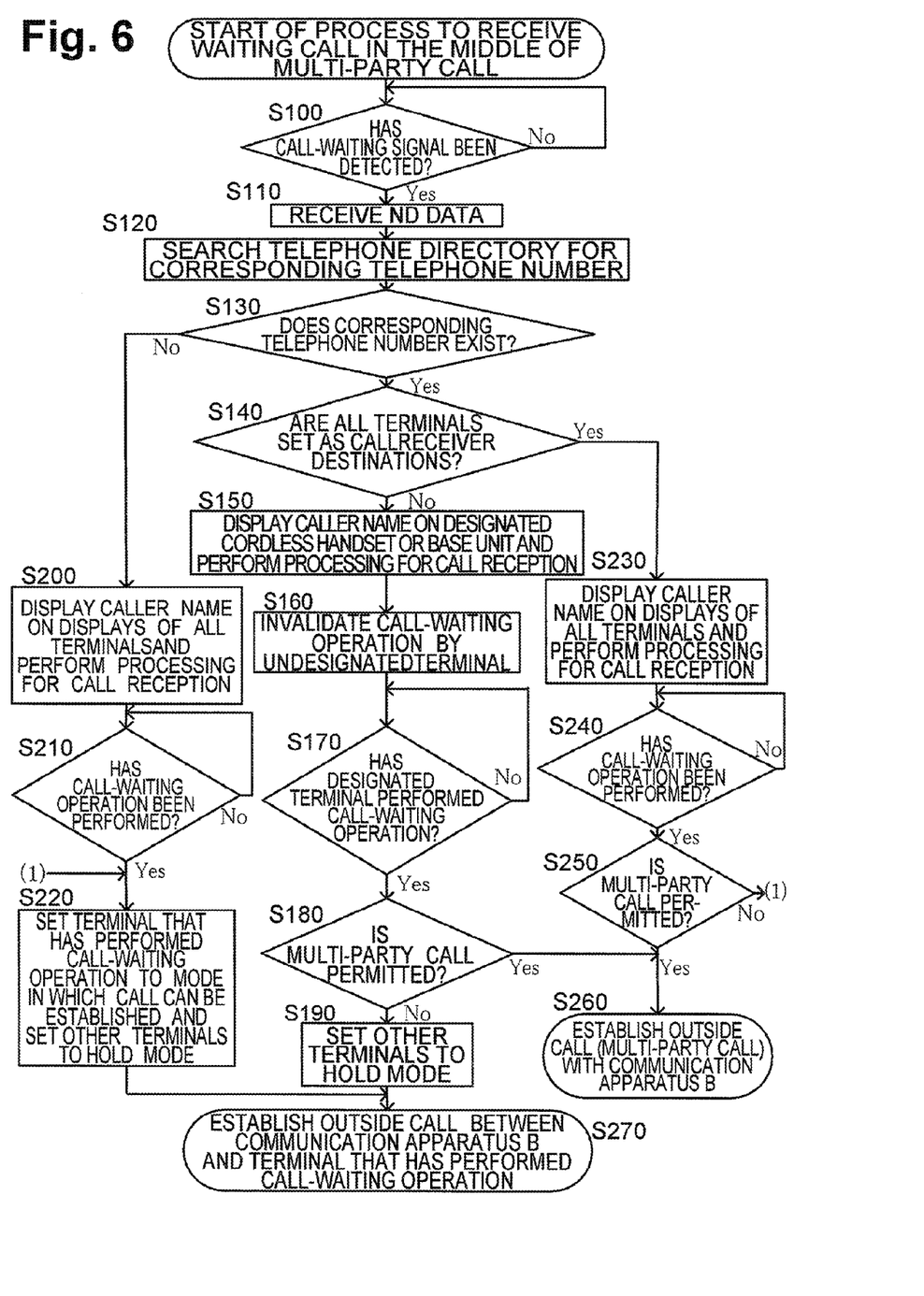
FIG. 6 is a flowchart showing a call-waiting signal reception process performed in the middle of a multi-party call.

FIG. 6 is a flowchart showing a call-waiting signal reception process performed in the middle of a multi-party call of the telephone apparatus according to this illustrative embodiment (a case where the base unit 13 permits the cordless handset 51 to receive a call).

In accordance with the flowchart shown in FIG. 6, the process to receive a waiting call in the middle of a multi-party call is performed. In this process, a base unit or a cordless handset that is not registered as a party to be called enters a hold mode, and a base unit or a cordless handset that is registered as a party to be called can establish a call with an external communication apparatus.

Hereinafter, the base unit 13, the cordless handset 51A, and the cordless handset 51B may be represented by terminals.

The CPU 6 of the base unit 13 determines whether an incoming call (call-waiting signal) from the communication apparatus B is detected in the middle of a call with the communication apparatus A (step S100).

If it is determined in step S100 that the CPU 6 detects a call-waiting signal (if the determination in step S100 is YES), the process proceeds to step S110.

If it is determined in step S100 that the CPU 6 does not detect a call-waiting signal (if the determination in step S100 is NO), the CPU 6 waits until a call-waiting signal is detected.

If it is determined in step S100 that the CPU 6 detects a call-waiting signal, the CPU 6 receives caller identification number data (hereinafter, referred to as ND data) (step S110).

After receiving the ND data, the CPU 6 searches the telephone directory stored in the EEPROM 10 for a telephone number represented by the received ND data (step S120).

It is determined whether the telephone number represented by the ND data exists in the telephone directory (step S130). If it is determined in step S130 that the telephone number represented by the ND data exists in the telephone directory (if the determination in step S130 is YES), it is determined whether all the terminals are set as call receiver destinations for the telephone number (step S140).

If it is determined in step S140 that all the terminals (the base unit 13, the cordless handset 51A, and the cordless handset 51B) are not set as call receiver destinations (if the determination in step S140 is NO), the name of the caller (the communication apparatus B) contained in the ND data is displayed on the display 4 or the display 24 of a terminal designated in data stored in the telephone directory, and processing for call reception is performed (step S150).

Then, the CPU 6 invalidates a call-waiting operation to be performed by a terminal not designated in the telephone directory (step S160), and determines whether the designated terminal has performed a call-waiting operation (step S170).

If it is determined in step S170 that the designated terminal has performed the call-waiting operation (if the determination in step S170 is YES), the CPU 6 proceeds to step S180.

If it is determined in step S170 that the designated terminal has not performed the call-waiting operation (if the determination in step S170 is NO), the CPU 6 waits until the call-waiting operation has been performed.

If it is determined in step S170 that the designated terminal has performed the call-waiting operation (if the determination in step S170 is YES), the CPU 6 refers to the telephone directory and determines whether establishment of a multi-party call is permitted (step S180).

If it is determined in step S180 that establishment of a multi-party call is permitted (if the determination in step S180 is YES), the CPU 6 performs processing for establishing a multi-party call among terminals designated in the telephone directory and the external communication apparatus B (step S260).

If it is determined in step S180 that establishment of a multi-party call is not permitted (if the determination in step S180 is NO), the CPU 6 causes the other designated terminals to be held in the hold mode (step S190). Then, the CPU 6 performs processing for establishing an outside call between the communication apparatus B and the terminal that has performed the call-waiting operation (step S270).

If it is determined in step S130 that the telephone number represented by the ND data received in step S110 does not exist in the telephone directory (if the determination in step S130 is NO), the CPU 6 displays the name of the caller contained in the ND data on the display 4 and the display 24 of all the terminals (the base unit 13, the cordless handset 51A, and the cordless handset 51B), and performs processing for call reception (step S200).

Then, the CPU 6 determines whether one of the terminals has performed a call-waiting operation (step S210).

If it is determined in step S210 that one of the terminals has performed a call-waiting operation (if the determination in step S210 is YES), the CPU 6 causes only the terminal that has performed the call-waiting operation to enter a mode in which a call with the communication apparatus B can be established and causes the other terminals to enter the hold mode (step S220).

Then, the CPU 6 performs processing for establishing an outside call between the communication apparatus B and the terminal that has performed the call-waiting operation (step S270).

If it is determined in step S210 that none of the terminals has performed a call-waiting operation (if the determination in step S210 is NO), the CPU 6 waits until one of the terminals has performed a call-waiting operation.

If it is determined in step S140 that all the terminals (the base unit 13, the cordless handset 51A, and the cordless handset 51B) are set as call receiver destinations (if the determination in step S140 is YES), the CPU 6 displays the name of the caller contained in the ND data on the display 4 and the display 24 of all the terminals (the base unit 13 the cordless handset 51A, and the cordless handset 51B), and performs processing for call reception (step S230).

Then, the CPU 6 determines whether one of the terminals has performed a call-waiting operation (step S240).

If it is determined in step S240 that one of the terminals has performed a call-waiting operation (if the determination in step S240 is YES), the CPU 6 proceeds to step S250. If it is determined in step S240 that none of the terminals has performed a call-waiting operation (if the determination in step S240 is NO), the CPU 6 waits until one of the terminals has performed a call-waiting operation.

If it is determined in step S240 that one of the terminals has performed the call-waiting operation (if the determination in step S240 is YES), the CPU 6 determines whether establishment of a multi-party call is permitted (step S250).

If it is determined in step S250 that establishment of a multi-party call is permitted (if the determination in step S250 is YES), the CPU 6 performs processing for establishing a multi-party call among terminals designated in the telephone directory and the communication apparatus B (step S260).

If it is determined in step S250 that establishment of a multi-party call is not permitted (if the determination in step S250 is NO), the CPU 6 causes only the terminal that has performed the call-waiting operation to enter a mode in which a call with the communication apparatus B can be established and causes the other terminals to enter the hold mode (step S220).

Then, the CPU 6 performs processing for establishing an outside call between the communication apparatus B and the terminal that has performed the call-waiting operation (step S270).

Functions attained by the processing of steps S180 to S190 and the processing of steps S250 to S260 correspond to computer-executable instructions, which can be executed by a processing unit in an aspect of the present invention.

While FIG. 6 has been described in connection with determining whether to enable a multi-party call to be established while an ongoing call is occurring, it will be appreciated that some of the steps in FIG. 6 may not be necessary or applicable when the determination is made when no ongoing call is occurring. Such modifications will be readily apparent to those of ordinary skill in the art such as eliminating the steps related to call waiting functions.

A storage unit in an aspect of the present invention is provided in the EEPROM 10 of the base unit 13 and the computer executable instructions are provided in one or more computer readable media such as the ROM 8 of the base unit 13 in the above-described illustrative embodiment. However, the storage unit may be provided in the EEPROM 30 of the cordless handset 51, and the computer executable instructions may be provided in one or more computer readable media such as the ROM 28 of the cordless handset 51. In this case, the cordless handset 51 transmits the information stored in EEPROM 30 to the EEPROM 10 of the base unit 13. It will be appreciated that the data stored in the storage unit in the base unit 13 may be entered through the operating part 3. Similarly, the data stored in the storage unit in the cordless handset(s) 51 may be entered through the operating part 23.

In this case, a call from the communication apparatus A or the communication apparatus B is automatically received by the cordless handset 51, and the cordless handset 51 determines whether establishment of a multi-party call is permitted or not.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

What is claimed is:

1. An apparatus comprising:
a base unit configured to establish a call with an external communication apparatus; and
one or more cordless handsets, each cordless handset configured to establish a call with the external communication apparatus through the base unit;
a storage unit configured to store, for each one of a plurality of external communication apparatuses, identification information that particularly identifies the external communication apparatus, call receiver designation information that indicates whether the base unit and the one or more cordless handsets are designated as call receivers and permission information that indicates whether a multi-party call is permitted to be established for the call from the external communication apparatus among the external communication apparatus, and at least two of the base unit and the one or more cordless handsets; and
a processing unit configured to
determine whether to enable a multi-party call to be established among the external communication apparatus, and at least two of the base unit and one or more of the cordless handsets by accessing the permission information of the external communication apparatus stored in the storage unit based on the identification information associated with the external communication apparatus, and
establish, when a multi-party call is determined to be enabled, a multi-party call among the external communication apparatus and at least two of the base unit and the one or more cordless handsets, wherein the multi-party call includes the base unit and the one or more cordless handsets which are designated as the call receivers.

2. The apparatus according to claim 1, wherein the storage unit and the processing unit are provided in the base unit.

3. The apparatus according to claim 1, wherein the storage unit and the processing unit are provided in one of the one or more cordless handsets.

4. The apparatus according to claim 1, wherein the base unit is part of a multi-function device.

5. In a system including a base unit, one or more cordless handsets configured to establish an external call through the base unit, and a storage unit, a method comprising:
storing in the storage unit, for each one of a plurality of external communication apparatuses, identification information that particularly identifies an external communication apparatus, call receiver designation information that indicates whether the base unit and the one or more cordless handsets are designated as call receivers and permission information that indicates whether a multi-party call is permitted to be established for the call from the external communication apparatus among the external communication apparatus, and at least two of the base unit and the one or more cordless handsets;
in response to receiving a call from one external communication apparatus, determining whether to enable a multi-party call to be established among the external communication apparatus and at least two of the base unit and the one or more cordless handsets by accessing the permission information of the external communication apparatus stored in the storage unit based on the identification information associated with the external communication apparatus; and
establishing, when a multi-party call is determined to be enabled, a multi-party call including the external communication apparatus and at least two of the base unit and the one or more cordless handsets, wherein the multi-party call includes the base unit and the one or more cordless handsets which are designated as the call receivers.

6. A non-transitory computer readable medium having computer-executable instructions stored thereon, which when executed by a processing unit perform a method for use in a system including a base unit, one or more cordless handsets configured to establish an external call through the base unit and a storage unit, the method comprising:
storing in the storage unit, for each one of a plurality of external communication apparatuses, identification information that particularly identifies an external communication apparatus, call receiver designation information that indicates whether the base unit and the one or more cordless handsets are designated as call receivers and permission information that indicates whether a multi-party call is permitted to be established for the call from the external communication apparatus among the external communication apparatus, and at least two of the base unit and the one or more cordless handsets;
in response to receiving a call from one external communication apparatus, determining whether to enable a multi-party call to be established among the external communication apparatus and at least two of the base unit and the one or more cordless handsets by accessing the permission information of the external communication apparatus stored in the storage unit based on the identification information associated with the external communication apparatus; and
establishing, when a multi-party call is determined to be enabled, a multi-party call including the external communication apparatus and at least two of the base unit and the one or more cordless handsets, wherein the multi-party call includes the base unit and the one or more cordless handsets which are designated as the call receivers.

* * * * *